(12) United States Patent
Vashistha et al.

(10) Patent No.: US 8,947,600 B2
(45) Date of Patent: Feb. 3, 2015

(54) METHODS, SYSTEMS, AND COMPUTER-READABLE MEDIA FOR DETECTING SCENE CHANGES IN A VIDEO

(75) Inventors: Aditya Vashistha, Rajasthan (IN); Rajarathnam Nallusamy, Trichy Dist. Tamil Nadu (IN); Sanjoy Paul, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 723 days.

(21) Appl. No.: 13/288,604

(22) Filed: Nov. 3, 2011

(65) Prior Publication Data
US 2013/0113999 A1    May 9, 2013

(51) Int. Cl.
*H04N 5/00*    (2011.01)
*H04N 5/14*    (2006.01)
*G06K 9/00*    (2006.01)

(52) U.S. Cl.
CPC ............ *H04N 5/147* (2013.01); *G06K 9/00765* (2013.01)
USPC ...................................................... 348/700

(58) Field of Classification Search
USPC ...................................................... 348/700
See application file for complete search history.

(56) References Cited

U.S. PATENT DOCUMENTS

| | | | |
|---|---|---|---|
| 5,099,322 | A | 3/1992 | Gove |
| 7,110,454 | B1 | 9/2006 | Chakraborty |
| 2003/0228056 | A1 | 12/2003 | Prakash et al. |
| 2006/0197879 | A1* | 9/2006 | Covell et al. .................. 348/700 |

FOREIGN PATENT DOCUMENTS

| | | |
|---|---|---|
| WO | 2007078801 A1 | 7/2007 |
| WO | 2007142646 A1 | 12/2007 |

OTHER PUBLICATIONS

Chen et al., "Video Scene Change Detection Method Using Unsupervised Segmentation and Object Tracking," in Proceedings of 2001 IEEE International Conference on Multimedia and Expo, Aug. 2001, 4 pages, Tokyo, Japan.
Dimou et al., "Scene Change Detection for H.264 Using Dynamic Threshold Techniques," in Proceedings of 5th EURASIP Conference on Speech and Image Processing, Multimedia Communications and Service, Jun. 29-Jul. 2, 2005, 6 pages, Slovak Republic.
Jiang et al., "Scene change detection techniques for video database systems," 1998, pp. 186-195, vol. 6, Multimedia Systems, Springer-Verlag.

(Continued)

*Primary Examiner* — Sath V Perungavoor
*Assistant Examiner* — Jeffery Williams
(74) *Attorney, Agent, or Firm* — LeClairRyan, a Professional Corporation

(57) ABSTRACT

A method, system and computer-readable media for detecting scene changes in a video that includes providing by one or more computing devices a plurality of passes through the video where a plurality of detected scenes from a first pass in a conventional method are identified and a second pass through the detected scenes are provided by the computing device. A plurality of scene boundary differences corresponding to the detected scenes, a fixed average, and a varying average are computed by the computing device. The scene boundary difference is compared with the fixed average and the varying average and if the scene boundary difference is less than the fixed average and the varying average, the detected scenes are combined else the detected scene being an abrupt scene change is determined. The steps of computing a varying average to combining the detected scenes are repeated by the computing device.

24 Claims, 7 Drawing Sheets

(56) References Cited

OTHER PUBLICATIONS

Lee et al., "Scene Change Detection Using Adaptive Threshold and Sub-Macroblock Images in Compressed Sequences," in Proceedings of 2001 IEEE International Conference on Multimedia and Expo, Aug. 2001, 4 pages, Tokyo, Japan.

Meng et al., "Scene Change Detection in a MPEG Compressed Video Sequence," IS&T/SPIE Symposium Proceedings, Feb. 1995, 8 pages, vol. 2419, San Jose, California.

Rascioni et al., "An Optimized Dynamic Scene Change Detection Algorithm for H.264/AVC Encoded Video Sequences," International Journal of Digital Multimedia Broadcasting, 2010, 9 pages, vol. 2010; Article ID 864123, Hindawi Publishing Corporation.

Vashistha et al., "2PASCD: An efficient 2-Pass Abrupt Scene Change Detection algorithm" in IEEE International Conference on Multimedia Networking and Security (MINES), Nov. 4-6, 2010, 5 pages, Nanjing, China.

\* cited by examiner

METHODS, SYSTEMS, AND COMPUTER-READABLE MEDIA FOR DETECTING SCENE CHANGES IN A VIDEO

FIELD OF THE INVENTION

The present invention relates to video processing. More particularly, it is concerned about computer-implemented methods, systems and computer-readable media for detecting scene changes in a video.

BACKGROUND OF THE INVENTION

The convergence of networks, devices, and services combined with the technological advancements in digital storage, multimedia compression, and miniaturization of digital cameras has led to an explosive growth of online video content. In addition to the professionally produced video content, user-generated content and content produced by hardcore amateurs are also on the rise. Videos can easily be shared over the Internet using popular video sharing sites such as YouTube and Yahoo! Video. Increasing volumes of online digital video content and large amount of information contained within each video make it a challenge to search and retrieve relevant video files from a large collection. Video data management systems aim at reducing this complexity by indexing the video files.

Indexing of video content as well as many digital watermarking algorithms require the video to be split into scenes. Scene change detection (SCD) is used for segmentation of videos into contiguous scenes. Scene change detection is instantly performed by human but vast computational resources and efficient complex algorithms are required to automate this process. Scene change detection in videos is a primary requirement of video processing applications used for the purpose of generating data needed by video data management systems and digital rights management (DRM) systems. Scene change detection is a fundamental step in content based video retrieval systems, video watermarking systems, video fingerprinting systems, video annotation systems, video indexing methods and video data management systems. Scene change data can be used in DRM systems for effective intellectual property rights protection by means of watermarking and fingerprinting selected scenes.

A video is a sequence of scenes and a scene is a sequence of images called frames. Scene changes in videos can either be gradual or abrupt. Abrupt scene changes can result from editing cuts. Gradual scene changes result from spatial effects such as zoom, camera pan and tilt, dissolve, fade in, fade out, etc. Detection of scene changes effectively depends on finding the similarity or the difference between adjacent frames. SCD usually involves measurement of some differences between successive frame images. There are several metrics used to compute the difference between two frames. Template matching, histogram comparison, and $\chi 2$ color histogram comparison are some of the techniques used to measure the inter-frame difference.

The existing scene change detection algorithms can be classified into two groups. One group is compressed domain which consists of algorithms that operate on compressed data and other group is uncompressed domain/Pixel domain which consists of algorithms that operate on pixel data.

The algorithms in compressed domain operate on compressed data, like algorithms based on Macro blocks in MPEG compressed video, algorithms based on motion characterization and segmentation for detecting scene changes in MPEG compressed video, algorithms based on statistical sequential analysis on compressed bit streams, algorithms based on feature extraction based on motion information and vectors or edges or luminance information.

The algorithms in uncompressed domain/pixel domain operate on pixel data directly like algorithms based on color diagrams, algorithms based on color histogram and fuzzy color histogram, algorithms based on edge detection and edge difference examinations, algorithms based on background difference and tracking and object tracking.

U.S. Pat. No. 7,110,454 discloses a system and method for detecting scene changes in a sequence of video frames utilizing a combination of a plurality of difference metrics including an interframe difference metric, a histogram difference metric and an interframe variance difference metric, as well as adaptive threshold level selection methods to dynamically select appropriate threshold levels for each of the difference metrics. The interframe and histogram difference metrics are used to identify abrupt scene changes and the interframe variance difference metric is used to identify gradual scene changes. The identified gradual and abrupt scene changes are validated by applying a plurality of conditions.

U.S. Pat. No. 5,099,322 discloses a system which detect scene changes in a sequence of video images by analyzing the sequence for abrupt frame-to-frame changes in certain image features. The system accepts the signal into a quantizer, which digitizes the image, and stores it into a frame buffer. An image processor, a component of the system, analyzes the digitized images, and determines certain features which a decision processor can use to detect a scene change.

US 2003228056 discloses a process and apparatus for identifying abrupt cuts or scene changes in any ordered sequence of images. In one specific embodiment, two or more consecutive images from a sequence are introduced to a segmenter as digital frames. The segmenter independently divides each of these frames into pixel regions or segments according to some common characteristic so that every pixel belongs to exactly one segment. A segment analysis unit then performs some statistical analysis on the segment data for each of the frames and generates composite statistics for each frame. A frame comparison unit then examines these composite statistics to determine whether these frames belong to a consistent scene of images. If the composite statistics for these frames differ sufficiently, the comparison unit declares the latter frame in the sequence to belong to a new scene. This information may then be transmitted back to the data source for the purpose of marking the scene change or for any other purpose.

WO/2007/142646 discloses an apparatus and method for detecting scene change by using a sum of absolute histogram difference (SAHD) and a sum of absolute display frame difference (SADFD). The apparatus and method use the temporal information in the same scene to smooth out the variations and accurately detect scene changes. The apparatus and method can be used for both real-time (e.g., real-time video compression) and non-real-time (e.g., film post-production) applications.

WO/2007/078801 discloses a system and method for scene change detection in a video sequence employing a randomly sub-sampled partition voting (RSPV) algorithm. In the video sequence, a current frame is divided into a number of partitions. Each partition is randomly sub-sampled and a histogram of the pixel intensity values is built to determine whether the current partition differs from the corresponding partition in a reference frame. A bin-by-bin absolute histogram difference between a partition in the current frame and a co-located partition in the reference frame is calculated. The histogram difference is compared to an adaptive threshold. If the majority of the examined partitions have significant changes, a scene change is detected. The RSPV algorithm is motion-independent and characterized by a significantly reduced cost of memory access and computations.

US 20110051809 discloses scene change detection in encoding digital pictures. A statistical quantity .mu..sub.M is calculated for a given section in a current picture. A window of one or more sections is defined around a co-located section in a previous picture. A statistical sum E is calculated over the sections in the window. A difference between the statistical sum E and the statistical quantity .mu..sub.M is calculated. The difference between E and .mu..sub.M is used to determine whether the given section is a scene-change section. Whether the current picture is a scene-change picture may be determined from the number of scene change sections. Information indicating whether or not the current picture is a scene-change picture may be stored or transferred.

US 20060239347 discloses a method and system for rate estimation in a video encoder. The method and system use a motion estimation metric to determine the position of a scene change. The average of the motion estimation metric is computed for a set of pictures. When change in the motion estimation metric average exceeds a threshold, a scene change is declared. Declaration of a scene change prior to video encoding enables a corresponding bit allocation that can preserve perceptual quality.

The existing technologies have various limitations. They do not identify the scene change with high precision and recall. The efficiency is low because of high false positive rate and false negative rate. For most algorithms, recall and precision values for scene change varies from 70-90% depending upon the content of the video. Many algorithms are sensitive to motion of object and camera, like zooming and panning. Luminance variance results in scenes to be incorrectly segmented like in cases of excessive brightness change or flickering. Some algorithms fail in case of scene change surrogated by frames of high motion. Algorithms do not consistently perform in cases like a cut, a fade, a dissolve or a wipe. A cut is a hard boundary. A fade is an effect of scene transition where it lasts for few frames. Fade in and fade out are two different kind of fades. A dissolve is a synchronous occurrence of fade in and fade out. A wipe is a scene transition event when a virtual line going on the screen clears the old scene and displays the new scene.

Thus, there is a need to overcome the problems of the existing technology. Therefore, the present inventors have developed computer-implemented methods, systems and computer-readable media for detecting scene changes in a video, which would propose an efficient 2-Pass Abrupt Scene Change Detection (2PASCD) algorithm. It would identify abrupt scene changes in the video efficiently and also identify those scenes which are incorrectly segmented as two different scenes and combine them.

SUMMARY OF THE INVENTION

According to one aspect of the invention there is provided a computer implemented method executed by one or more computing devices to detect scene changes in a video, said method comprising the steps of:
  a) providing, by at least one of the computing devices, plurality of passes through the video;
  b) wherein identifying, by at least one of the computing devices, plurality of detected scenes from a first pass in a conventional method;
  c) providing, by at least one of the computing devices, a second pass through said plurality of detected scenes;
  d) computing, by at least one of the computing devices, plurality of scene boundary differences corresponding to said plurality of detected scenes;
  e) computing, by at least one of the computing devices, a fixed average;
  f) computing, by at least one of the computing devices, a varying average;
  g) comparing, by at least one of the computing devices, said scene boundary difference with said fixed average and said varying average;
  h) combining, by at least one of the computing devices, said detected scenes if said scene boundary difference is less than said fixed average and said varying average; else determining said detected scene being an abrupt scene change; and
  i) repeating, by at least one of the computing devices, the steps (f) through (h) until the last scene boundary difference.

According to another aspect of the invention there is provided a system for detecting scene changes in a video, said system comprising:
  a memory, and
  a processor operatively coupled to the memory, the processor configured to perform the steps of:
  a) providing, by at least one of the computing devices, plurality of passes through the video;
  b) wherein identifying, by at least one of the computing devices, plurality of detected scenes from a first pass in a conventional method;
  c) providing, by at least one of the computing devices, a second pass through said plurality of detected scenes;
  d) computing, by at least one of the computing devices, plurality of scene boundary differences corresponding to said plurality of detected scenes;
  e) computing, by at least one of the computing devices, a fixed average;
  f) computing, by at least one of the computing devices, a varying average;
  g) comparing, by at least one of the computing devices, said scene boundary difference with said fixed average and said varying average;
  h) combining, by at least one of the computing devices, said detected scenes if said scene boundary difference is less than said fixed average and said varying average; else determining said detected scene being an abrupt scene change; and
  i) repeating, by at least one of the computing devices, the steps (f) through (h) until the last scene boundary difference.

According to another aspect of the invention there is provided a Computer-readable code stored on a non-transitory computer-readable medium that, when executed by a computing device, performs a method for detecting scene changes in a video, the method comprising the steps of:
  a) providing, by at least one of the computing devices, plurality of passes through the video;
  b) wherein identifying, by at least one of the computing devices, plurality of detected scenes from a first pass in a conventional method;
  c) providing, by at least one of the computing devices, a second pass through said plurality of detected scenes;
  d) computing, by at least one of the computing devices, plurality of scene boundary differences corresponding to said plurality of detected scenes;
  e) computing, by at least one of the computing devices, a fixed average;

f) computing, by at least one of the computing devices, a varying average;

g) comparing, by at least one of the computing devices, said scene boundary difference with said fixed average and said varying average;

h) combining, by at least one of the computing devices, said detected scenes if said scene boundary difference is less than said fixed average and said varying average; else determining said detected scene being an abrupt scene change; and i) repeating, by at least one of the computing devices, the steps (f) through (h) until the last scene boundary difference.

Figure 1:
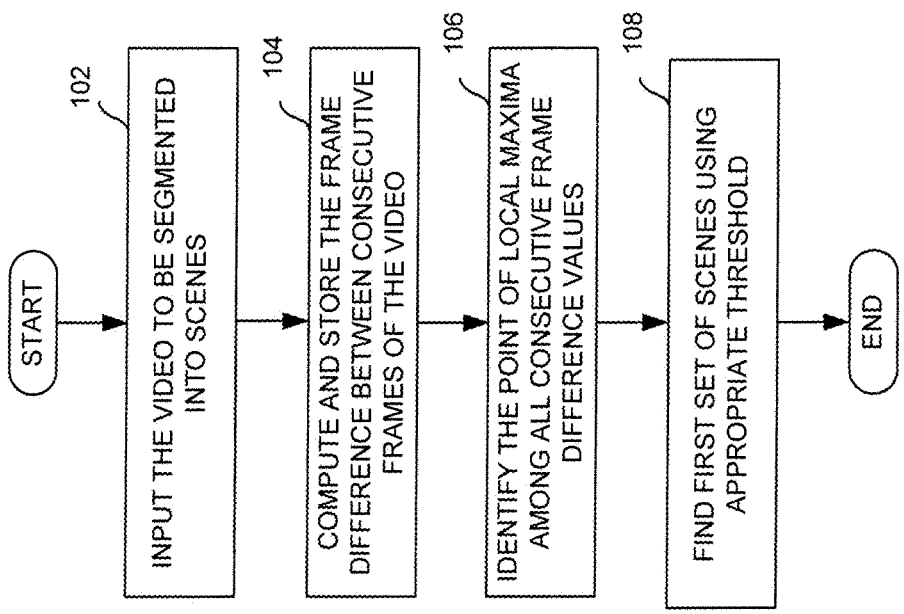
FIG. 1 illustrates a process involved in first pass of 2PASCD algorithm.

While systems and methods are described herein by way of example and embodiments, those skilled in the art recognize that systems and methods for providing computer-implemented methods, systems and computer-readable media for detecting scene changes in a video, which are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE INVENTION

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or"B" includes: "A" by itself, "B" by itself and any combination thereof, such as "AB" and/or"BA." It is worth noting that the present discussion relates to exemplary embodiments, and the appended claims should not be limited to the embodiments discussed herein.

Disclosed embodiments provide computer-implemented methods, systems, and computer-readable media for detecting scene changes in a video, which combines incorrectly segmented scenes. The present invention provides computer-implemented methods, systems, and computer-readable media using a two phase algorithm i.e. a 2-Pass Abrupt Scene Change Detection (2PASCD) algorithm to improve the accuracy of scene change detection and yet maintain a low computational complexity.

The 2-Pass Abrupt Scene Change Detection (2PASCD) algorithm comprises two passes. In the first pass, scene changes are identified using $\chi^2$ color histogram comparison of sub-windows of successive frames and sliding window detector using an appropriate threshold. In the second pass, scene changes identified during the first pass are re-assessed using a fixed scene invariant average and a scene based varying average or moving average, to identify the cases where a scene is incorrectly fragmented. If such cases are found, then scene boundaries are re-calculated. Second pass of 2PASCD algorithm is efficient and computationally inexpensive as the data required for second pass is already computed during the first pass of 2PASCD algorithm. In addition, usage of lower threshold value or higher relative threshold percentage during first pass results in higher recall and lower false negative rate. Second pass of the algorithm ensures higher precision and lower false positive rate.

FIG. 1 shows a process involved in first pass of 2PASCD algorithm based on methods presented by many researchers.

Step 1: A video to be segmented into scenes is inputted.

Step 2: The frame difference between two consecutive frames, $F_{i,i+1}$, is calculated for all frames of the input video using local $\chi^2$ color histogram comparison using k bins (k is a power of 2) and breaking down each frame into w×w windows. Weight for brightness grade change of each color space is also used to calculate the difference among consecutive frames to make the scene change detection process robust. The frame difference values are stored. Suppose if total number of frames in the video to be segmented is N, then total N−1 frame difference values are computed and stored.

$D_{ii+1}$=Difference between frame $F_i$ and frame $F_{i+1}$, where i varies from 1 to N−1.

$D_{ii+1}$ is calculated by computing the local $x^2$ color histogram difference using k bins where k is a power of 2 and breaking down a frame into w×w windows.

The local χ2 color histogram comparison of sub-windows or blocks then becomes $$d_{\chi^2}(F_i, F_j, bl) = \sum_{k=1}^{N-1} \left( \frac{(H_i^r(k) - H_j^r(k))^2}{\max(H_i^r(k), H_j^r(k))} \right) \times \alpha + \left( \frac{(H_i^g(k) - H_j^g(k))^2}{\max(H_i^g(k), H_j^g(k))} \right) \times \beta + \left( \frac{(H_i^b(k) - H_j^b(k))^2}{\max(H_i^b(k), H_j^b(k))} \right) \times \gamma$$

Step 3: Peak values are points of local maxima and are identified among all stored N−1 frame difference values. A Peak value is a frame difference value which is greater than both previous and next frame difference value. Let there be total R points of local maxima.

Step 4: An appropriate threshold factor, X, is selected. For instance, in the present invention, threshold factor between 3~4 is used.

Step 5: Threshold factor is used to identify those points of local maxima which fulfill the threshold condition. From these points of local maxima, the key frames are identified. If the peak value is greater than X times of average of previous five frame difference value, then the frame corresponding to this frame difference value is considered as key frame. Key frame is nothing but the start frame of a new scene. Thus, the first set of abrupt scene changes is obtained using first pass of the algorithm. Let the number of scenes obtained by first pass be P where P≤R. Here, an adaptive threshold can also be used to identify the first set of scene change detection.

Figure 2:
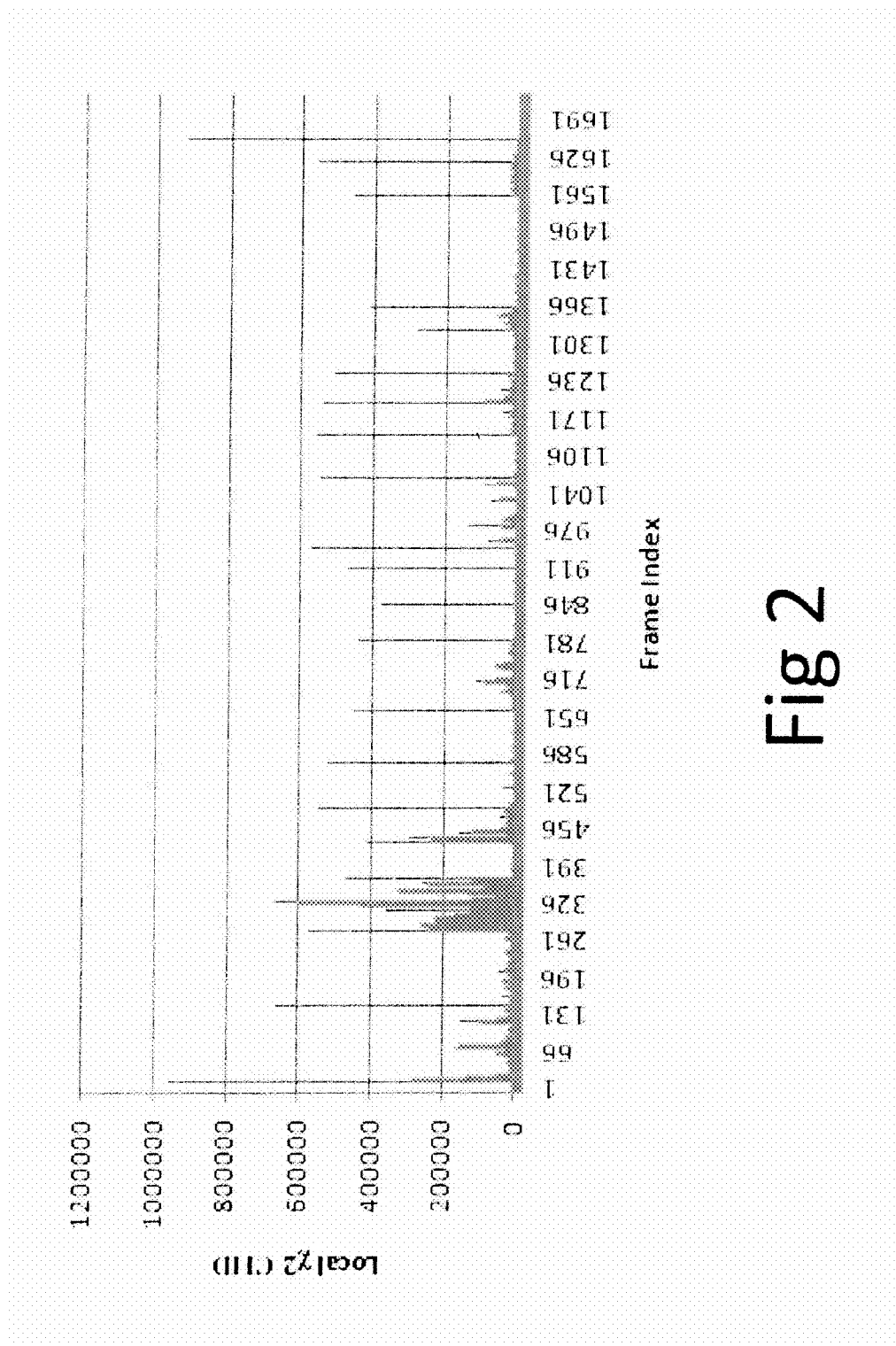
FIG. 2 illustrates color histogram difference between consecutive frames.

FIG. 2 shows Color histogram difference between consecutive frames, there is a large variation of the frame difference values obtained by the above mentioned equation and it is difficult to obtain information about connected frames of a scene. Hence, it uses a sliding window detector to extract robust scene changes from frame differences by comparing the frame difference value of the frame corresponding to the point of local maxima. There is a scene change at the point of local maxima, if the average frame difference of previous five frames is less than an appropriate threshold value.

Figure 3:
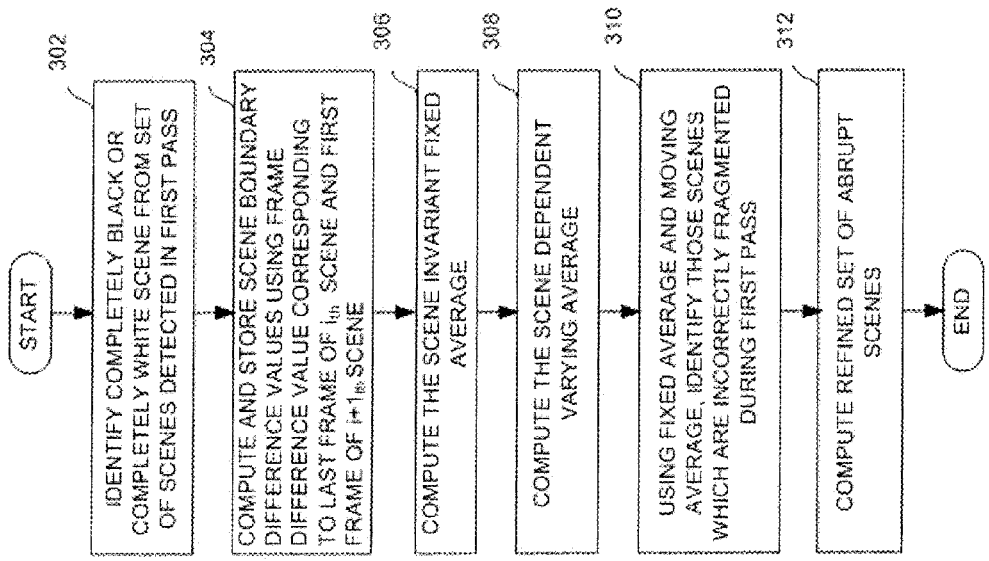
FIG. 3 illustrates a process involved in second pass of 2PASCD algorithm.

FIG. 3 shows a process involved in second pass of 2PASCD algorithm, which is to improve the efficiency of abrupt scene change detection by inspecting and refining the scene changes detected by first pass.

Step 1: Scenes obtained after first pass of 2PASCD algorithm are inspected to identify completely black or completely white scene(s). This is achieved by inspecting the consecutive frame difference values corresponding to all frames contained in a scene. The frame difference values are already computed and stored in first pass, therefore, only small computation is required. A scene is considered as black scene or white scene only if the median value for consecutive frame differences is zero corresponding to all frames contained in that scene.

Step 2: Scene boundaries are inspected to calculate the abruptness between two scenes. Abruptness between two adjacent scenes can be best measured by the degree with which they change. Higher the degree of change, more abrupt the scene change is. The degree of change between two adjacent scenes can be measured by computing the scene boundary difference. Scene boundary difference value is the frame difference between the last frame of first scene and first frame of second scene. Scene boundary difference values are a measure of the abruptness between two scenes. Larger the scene boundary difference value, higher is the probability that two scenes are distinct and cannot be clubbed together. P−1 scene boundary difference values ($DS_{j,j+1}$) are obtained using this step.

Step 3: Identifying whether a scene boundary difference value is significantly high or low is critical and complex. A scene invariant fixed average and scene dependent varying average are computed to identify those scene boundary difference values that are high in comparison to other values and are actually boundary of two abrupt scenes. In this step, a scene invariant fixed average, $(D_f)_{avg}$, is computed. This average remains fixed throughout second pass for all scenes in the video to be segmented. Fixed average is computed by taking simple average corresponding to previously computed scene boundary difference values for all non-black and non-white scenes.

Step 4: For each scene, a varying average, $(D_v)_{avg}$, is computed using the scene boundary difference values corresponding to previously detected abrupt scene changes. Initially varying average is same as fixed average. Later, varying average is computed as half of the scene boundary difference value corresponding to previous detected abrupt scene change.

Step 5: Scene dependent varying average and scene invariant fixed average are used against each scene boundary difference values to identify whether a scene is an abrupt scene or the scenes corresponding to a scene boundary difference value are same scene which are incorrectly segmented as two different scenes during the first pass of 2PASCD algorithm. If the scene boundary difference value is less than both fixed average and varying average then scenes corresponding to the scene boundary difference value are considered as incorrectly fragmented scenes else only the first scene corresponding to a scene boundary difference value is considered as abrupt scene change. Once an abrupt scene change is detected, scene variant varying average is updated. This step is computed for all P−1 scene boundary difference values. As a result, refined set of abrupt scene changes are obtained.

Figure 4:
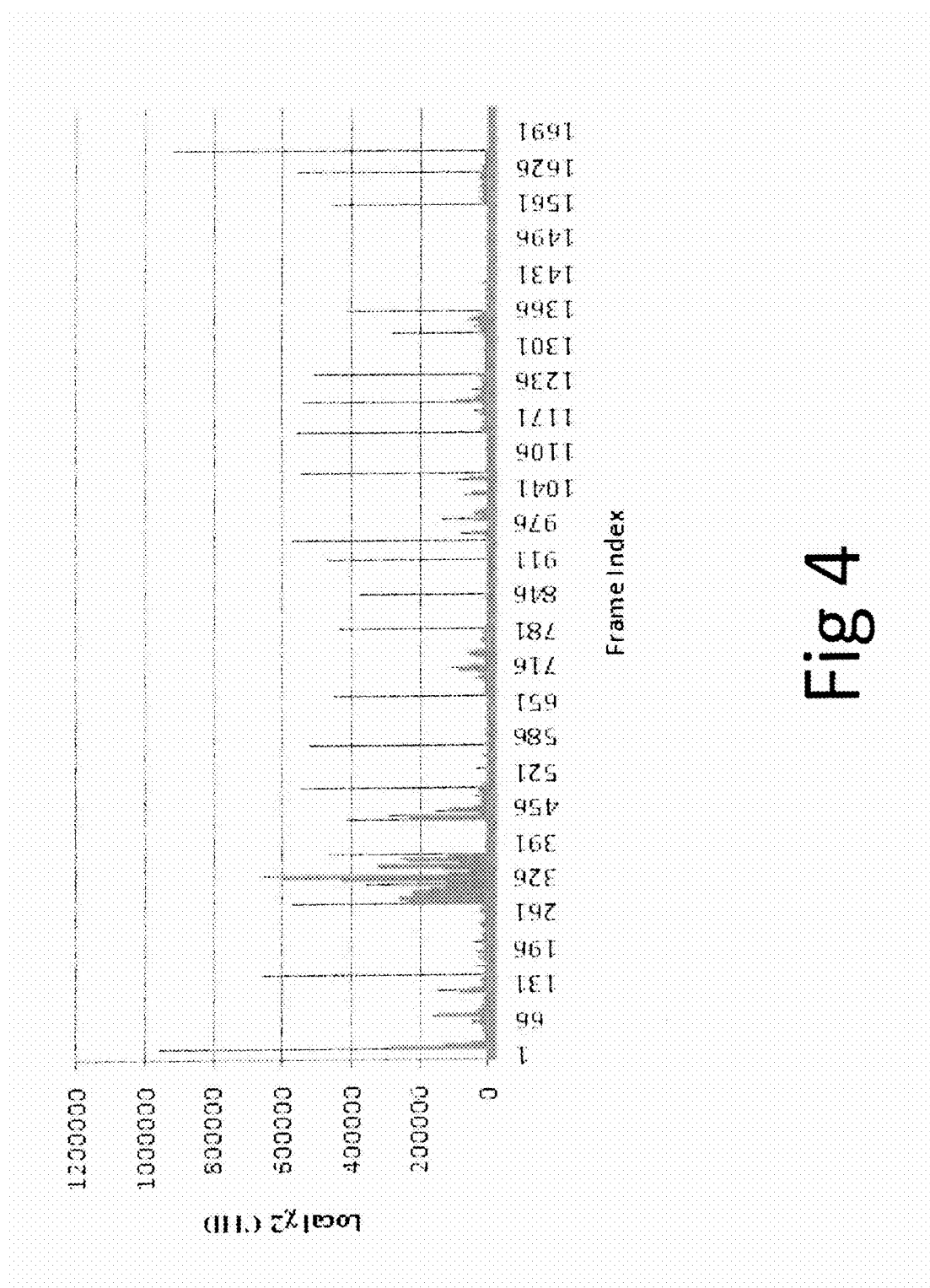
FIG. 4 illustrates color histogram difference at scene boundary.

FIG. 4 shows color histogram difference at scene boundary where the plot of $(D_f)_{avg}$ and $(D_v)_{avg}$ are also provided.

The advantages of using second pass, with the concept of fixed average and scene dependent varying average is to identify the abrupt scene changes in the video; to combine the scenes which are incorrectly fragmented as different scenes from the first pass into a single scene; to detect the relative difference between a scene and last detected abrupt scene and to determine the extent to which a scene actually differs from the previously detected abrupt scene.

Second pass of the proposed algorithm is computationally inexpensive as the data required, which are scene boundary difference values, are already computed during the first pass.

Figure 7:
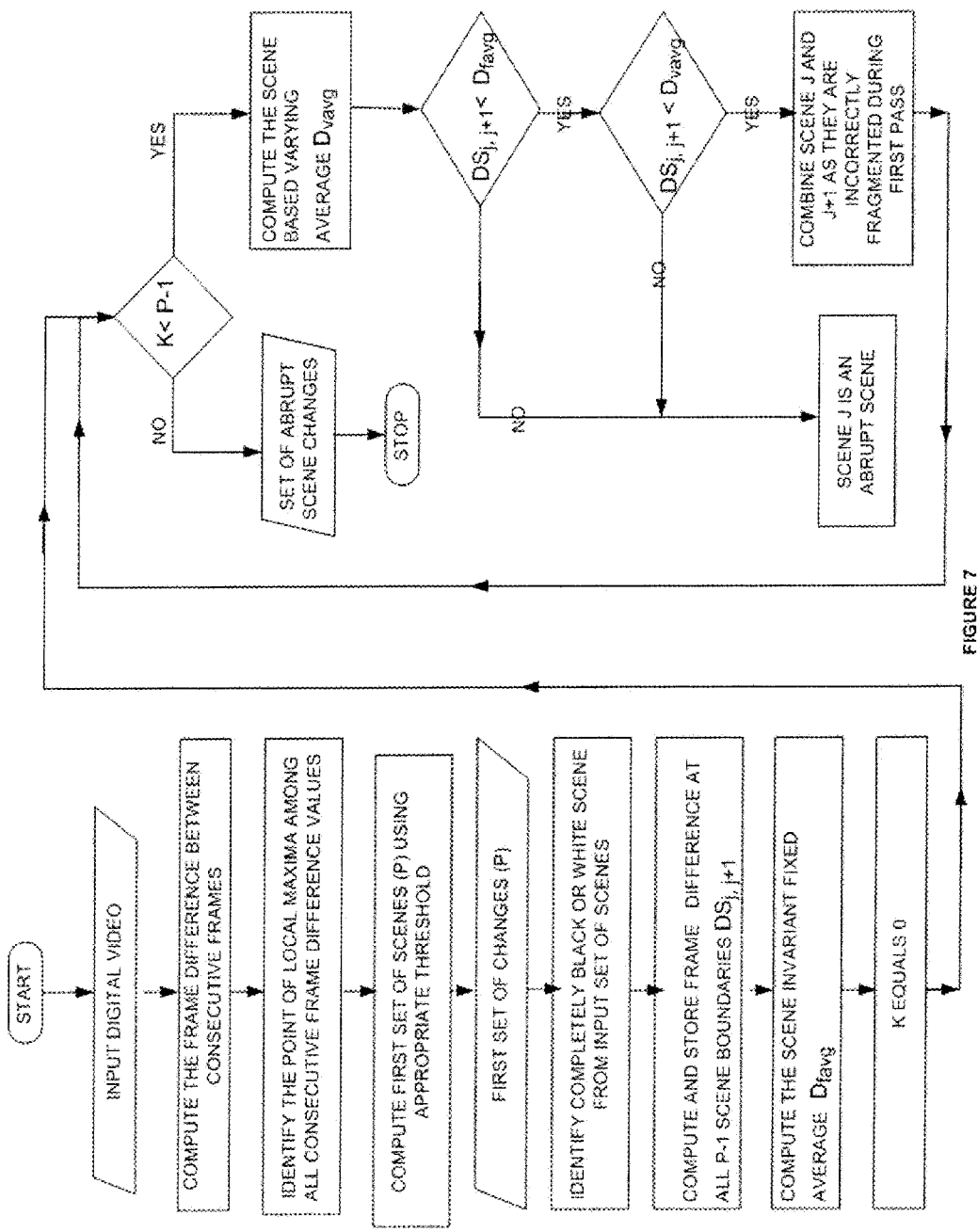
FIG. 7 illustrates a flowchart of 2PASCD algorithm.

FIG. 7 shows the flowchart of 2PASCD algorithm covering both first and second passes.

Experimental Results

In order to study the efficiency of the 2PASCD algorithm various experiments are conducted using different video files. The algorithm is implemented using Java Media Framework (JMF) API.

The performance of the algorithm is evaluated by using precision and recall metrics which are widely used in the area of information retrieval. Two different threshold values (1/X=25% and 33%) and (2×2) and (4×4) sub-windows were used in the experiments. Number of scenes detected after the first pass and second pass of the algorithm are obtained. Actual number of scenes present in the video along with the number of missed scenes and incorrectly detected scenes were obtained after visually inspecting the frames in each scene and at the scene boundaries.

Performance Metrics Used

Precision and recall are the two metrics widely used in establishing the effectiveness of an information retrieval method. In SCD, precision is defined as the ratio of number of scene changes correctly detected to the total number of scene changes detected. Recall is the ratio of number of scene changes correctly detected to the total number of scene changes that exist. Thus, $$\text{Precision} = \frac{N_d}{N_d + N_f}$$

and $$\text{Recall} = \frac{N_d}{N_d + N_m}$$

where $N_d$=number of correctly detected scene changes $N_f$=number of falsely detected scene changes $N_m$=number of scene changes missed The results of the 2PASCD algorithm based on the number of scenes detected after first pass and second pass of the algorithms are presented in Tables I and II.

TABLE I

Improvement on the efficiency of abrupt scene change detection due to 2PASCD algorithm using 25% threshold and (4 × 4) windows.

| Name of the video | Number of correct scenes | 1st pass Precision | 1st pass Recall | 2nd pass Precision | 2nd pass Recall |
|---|---|---|---|---|---|
| Stocking up for the 'storm of the decade' | 21 | 75 | 100 | 100 | 100 |
| As the city sleeps | 14 | 34.1 | 100 | 100 | 100 |
| Journey into the 'Emerald Triangle' | 61 | 69.3 | 100 | 100 | 96.7 |
| A Portrait of Coney Island | 57 | 86.3 | 95 | 98 | 87.8 |
| Bless Your Pet | 21 | 84 | 100 | 100 | 100 |
| Moving through Metro | 71 | 84.5 | 95.9 | 95.6 | 91.6 |

From the data presented in Table I, it is clear that the 2PASCD is efficient as it provides 100% precision and recall for half of the test videos using 25% threshold value.

From Table I, for the other videos, while the precision varies from 95.6% to 98%, the recall varies from 87.8% to 96.7%, which shows that the 2PASCD gives better results for a wide range of videos. 2PASCD algorithm is successfully tested for wide range of videos like static videos, videos with slow motion, videos containing fast motion, videos having brightness variations, etc.

TABLE II

Effect of threshold and sub-window size on precision and recall.

| Name of the video | 25% threshold (2 × 2) windows Precision | 25% threshold (2 × 2) windows Recall | 25% threshold (4 × 4) windows Precision | 25% threshold (4 × 4) windows Recall | 33% threshold (4 × 4) windows Precision | 33% threshold (4 × 4) windows Recall |
|---|---|---|---|---|---|---|
| Stocking up for the 'storm of the decade' | 95.2 | 95.2 | 100 | 100 | 87.5 | 100 |
| As the city sleeps | 100 | 100 | 100 | 100 | 100 | 100 |
| Journey into the 'Emerald Triangle' | 100 | 96.7 | 1.00 | 96.7 | 100 | 96.7 |
| A Portrait of Coney Island | 97.8 | 84.2 | 98 | 87.8 | 93.2 | 96.5 |
| Bless Your Pet | 100 | 100 | 100 | 100 | 100 | 100 |
| Moving through Metro | 97 | 91.6 | 95.6 | 91.6 | 95.7 | 94.4 |

Table 11 shows that dividing the frames into more number of sub-windows (4×4) improves the precision and recall values for videos which were giving lower precision and recall values when less number of sub-windows (2×2) were used. Precision is more important in detecting abrupt scene changes for the purpose of watermarking.

A higher threshold value gives better recall values. In Table 11, recall which varied from 87.8% to 100% for a threshold value of 25%, increases to 94.4% to 100% for a threshold value of 33%.

Figure 5:
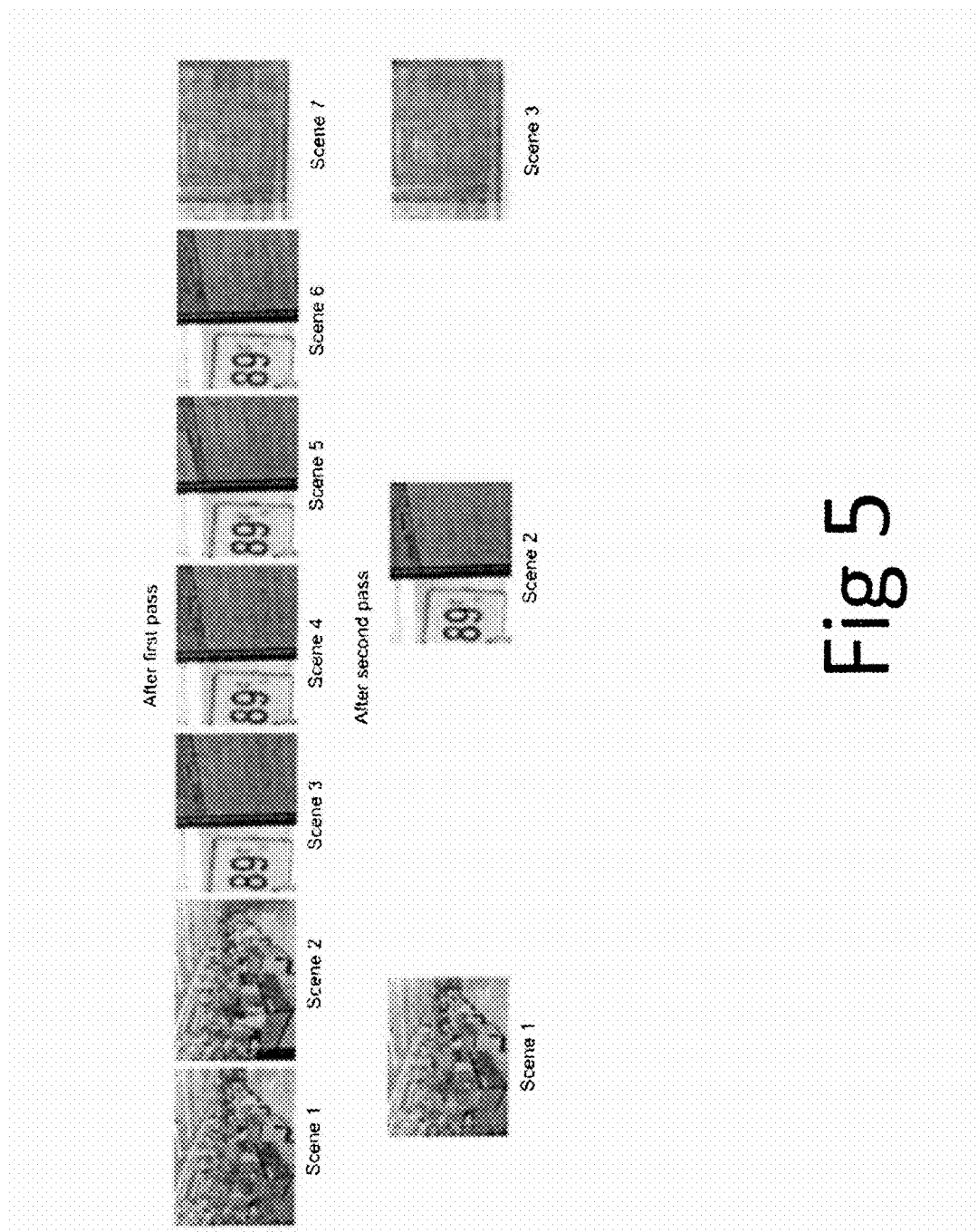
FIG. 5 illustrates average scene images after first and second pass of the algorithm.

FIG. 5 shows how a scene fragmented by first pass (scenes 3, 4, 5, and 6) because of the changing text in the display board are clubbed into a single scene after the second pass of the algorithm. Scenes 1 and 2 fragmented by first pass because of fast movement of persons, are clubbed together in second pass. The scene 7 remains as it is and becomes scene 3 after second pass.

It is observed that the 2PASCD incorrectly fragments a scene in which there are sudden illuminations in few frames like most other algorithms.

The present invention provides the efficient 2PASCD algorithm by introducing a second pass to existing abrupt scene change detection algorithms. By inspecting the frame differences at the scene boundaries, decision is made whether the scenes detected after the first pass actually are different scenes or fragmentation of same scene. By analyzing six different videos, it is shown that the precision values are considerably improved by the 2-pass algorithm after the second pass. It is also shown that choosing a higher threshold value within the effective threshold range improves the recall values. The 2PASCD algorithm produces better precision values as compared to existing algorithms.

Exemplary Computing Environment

Figure 6:
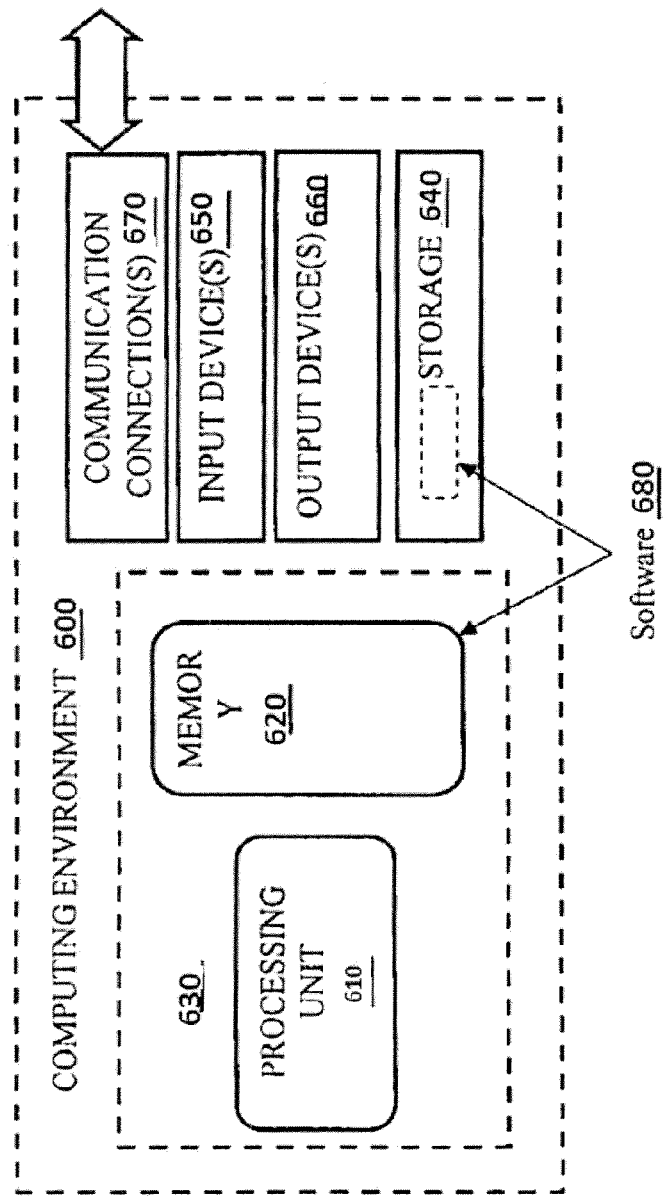
FIG. 6 illustrates a generalized computer network arrangement, in one embodiment of the present technique.

One or more of the above-described techniques may be implemented in or involve one or more computer systems. FIG. 6 shows a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which may be used to store information and which may be accessed within the computing environment 600. In some embodiments, the storage 640 stores instructions for the software 680.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

We claim:

1. A method for detecting scene changes in a sequence of video frames, the method comprising:
    detecting, by an image processing computing device, a plurality of scenes from a sequence of video frames;
    identifying, by the image processing computing device, a plurality of scene boundary differences corresponding to the plurality of detected scenes;
    determining, by the image processing computing device, a scene invariant fixed average for the plurality of scene boundary differences and a scene dependent varying average for each of the plurality of detected scenes corresponding to the identified plurality of scene boundary differences;
    comparing, by the image processing computing device, for each of the plurality of detected scenes, the scene boundary difference between the scene invariant fixed average and the scene dependent varying average;
    combining, by the image processing computing device, the detected scenes when the scene boundary difference is less than the scene invariant fixed average and the scene dependent varying average; and
    identifying, by the image processing computing device, each of the plurality of detected scenes corresponding to when the scene boundary difference is greater than the scene invariant fixed average and the scene dependent varying average.

2. The method of claim 1, wherein the plurality of detected scenes comprise a plurality of black and white video scenes.

3. The method of claim 1, wherein the scene boundary difference is a difference between two consecutive detected scenes.

4. The method of claim 3, wherein the scene boundary difference is a difference between a last frame of the detected scene of the two consecutive detected scenes and a first frame of the detected scene of the two consecutive detected scenes.

5. The method of claim 1, wherein the identifying, by the image processing computing device, a scene boundary difference comprises an $\chi 2$ color histogram comparison.

6. The method of claim 1, wherein the scene invariant fixed average is an average of all of the scene boundary differences.

7. The method of claim 1, wherein the scene dependent varying average being is the scene invariant fixed average for a first scene boundary difference.

8. The method of claim 1, wherein the scene dependent varying average is half the value of the scene boundary difference corresponding to a previously detected abrupt scene change.

9. A image processing computing device comprising:
    at least one processor;
    a memory coupled to the at least one processor which is configured to be capable of executing programmed instructions stored in the memory comprising:
    detecting a plurality of scenes from a sequence of video frames;
    identifying a plurality of scene boundary differences corresponding to the plurality of detected scenes;
    determining a scene invariant fixed average for the plurality of scene boundary differences and a scene dependent varying average for each of the plurality of detected scenes corresponding to the identified plurality of scene boundary differences;
    comparing, for each of the plurality of detected scenes, the scene boundary difference between the scene invariant fixed average and the scene dependent varying average;

combining the detected scenes when the scene boundary difference is less than the scene invariant fixed average and the scene dependent varying average; and identifying each of the plurality of detected scenes corresponding to when the scene boundary difference is greater than the scene invariant fixed average and the scene dependent varying average.

10. The device of claim 9, wherein the plurality of detected scenes comprise a plurality of black and white video scenes.

11. The device of claim 9, wherein the scene boundary difference is a difference between two consecutive detected scenes.

12. The device of claim 11, wherein the boundary difference is a difference between a last frame of the detected scene of the two consecutive detected scenes and a first frame of the detected scene of the two consecutive detected scenes.

13. The device of claim 9, wherein the identifying a scene boundary difference comprises an $\chi 2$ color histogram comparison.

14. The device of claim 9, wherein the scene invariant fixed average is an average of all of the scene boundary differences.

15. The device of claim 9, wherein the scene dependent varying average is the scene invariant fixed average for a first scene boundary difference.

16. The device of claim 9, wherein the scene dependent varying average is half the value of the scene boundary difference corresponding to a previously detected abrupt scene change.

17. A non-transitory computer-readable medium having stored thereon instructions for detecting scene changes in a sequence of video frames comprising machine executable code which when executed by a processor, causes the processor to perform steps comprising:

detecting a plurality of scenes from a sequence of video frames;

identifying a plurality of scene boundary differences corresponding to the plurality of detected scenes;

determining a scene invariant fixed average for the plurality of scene boundary differences and a scene dependent varying average for each of the plurality of detected scenes corresponding to the identified plurality of scene boundary differences;

comparing, for each of the plurality of detected scenes, the scene boundary difference between the scene invariant fixed average and the scene dependent varying average;

combining the detected scenes when the scene boundary difference is less than the scene invariant fixed average and the scene dependent varying average; and identifying each of the plurality of detected scenes corresponding to when the scene boundary difference is greater than the scene invariant fixed average and the scene dependent varying average.

18. The non-transitory computer-readable medium of claim 17, wherein the plurality of detected scenes comprise a plurality of black and white video scenes.

19. The non-transitory computer-readable medium of claim 17, wherein the scene boundary difference is a difference between two consecutive detected scenes.

20. The non-transitory computer-readable medium of claim 19, wherein the boundary difference is a difference between a last frame of the detected scene of the two consecutive detected scenes and a first frame of the detected scene of the two consecutive detected scenes.

21. The non-transitory computer-readable medium of claim 17, wherein the identifying a scene boundary difference comprises an $\chi 2$ color histogram comparison.

22. The non-transitory computer-readable medium of claim 17, wherein the scene invariant fixed average is an average of all of the scene boundary differences.

23. The non-transitory computer-readable medium of claim 17, wherein the scene dependent varying average is the scene invariant fixed average for a first scene boundary difference.

24. The non-transitory computer-readable medium of claim 17, wherein the scene dependent varying average is half the value of the scene boundary difference corresponding to a previously detected abrupt scene.

* * * * *